March 26, 1940.  H. C. WRIGHT  2,194,515

SHEARING MACHINE

Filed May 15, 1937

Inventor:
Horace C. Wright
By
Wilson, Dowell, McCanna & Wintercorn
Attys.

Patented Mar. 26, 1940

2,194,515

UNITED STATES PATENT OFFICE 2,194,515

SHEARING MACHINE

Horace C. Wright, Chicago, Ill., assignor to Chicago Flexible Shaft Company, Chicago, Ill., a corporation of Illinois Application May 15, 1937, Serial No. 142,810

3 Claims. (Cl. 30—208).

This invention relates to shearing machines, and has special reference to a combination of cutting blades therefor commonly known as combs and cutters.

In the manufacture of shearing devices for sheep and the like, numerous improvements have been made in the past in the means for driving the cutters, means for applying pressure thereto, and other elements of the device, most of which have been associated with the driving mechanism and the convenience of operation. While these improvements have been instrumental in increasing the shearing rate to a certain extent, I am convinced that too little attention has been paid to the cutters themselves and to the design thereof for the purpose of increasing the shearing rate and the ease and facility with which the shearing operation is performed. In my Patent No. 2,081,318, granted May 25, 1937, I have disclosed an improvement in the form of the shearing comb which results in a substantial and material improvement in shearing rate and facility. The present application is directed to an improvement thereover wherein the comb and the cutter are so inter-related as to produce an improved shearing action over that of the above-mentioned application.

An important object of the invention is the provision of a shearing machine of greater efficiency than those heretofore known such that the cutters move through the wool with greater speed and facility.

A further object of the invention is the provision of a shearing comb of improved characteristics.

I have also aimed to provide an improved cutter adapted in combination with the comb to facilitate the shearing operations.

Another object of the invention is the provision of a shearing machine having a comb and cutter arranged in such manner as to cut twice across the comb teeth at which the cutter operates at its lowest speed, at each stroke of the cutter.

Other objects and advantages will become apparent to those skilled in the art from the following description and the accompanying drawing, in which—

Figure 1:
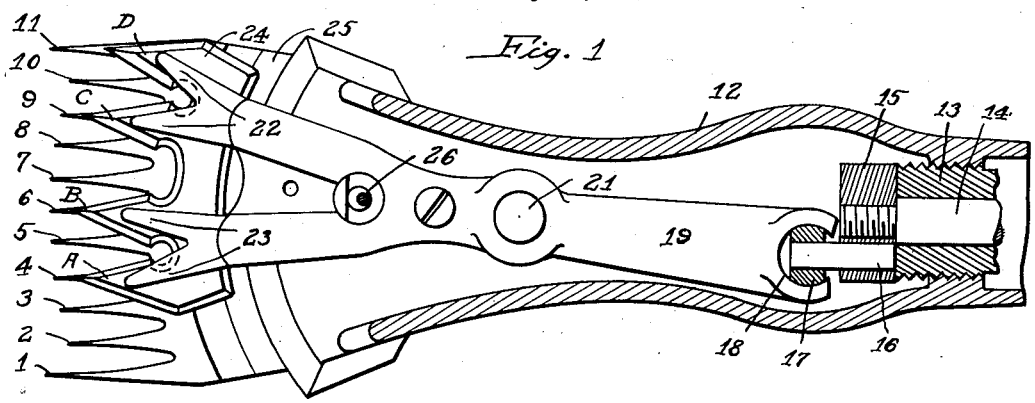
Figure 2:
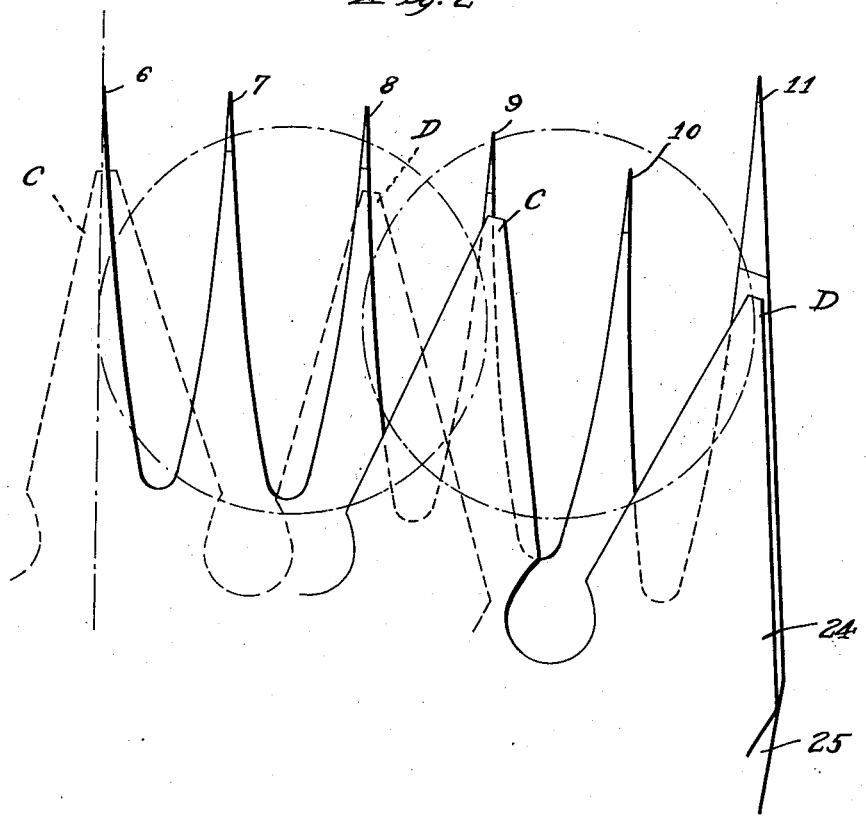

Figure 1 is a longitudinal section through a shearing hand piece having cutters embodying my invention, and Fig. 2 is a diagrammatic view of one-half of the comb, showing the manner in which the cutter operates thereon.

In Figure 1 I have shown a shearing hand piece of known general construction having a casing designated generally by the numeral 12 which acts as a handle by means of which the cutters are moved through the wool. A bearing 13 is positioned in the hollow casing and carries a driven shaft 14, which acts to drive the cutter. The forward end of the shaft 14 carries a crank 15 having an eccentric crank pin 16. The crank pin 16 carries a ball 17 which seats in a socket 18 within which the ball has longitudinal movement as the crank rotates, in a well known manner. The socket 18 is positioned on the end of a fork 19 which is pivoted intermediate its ends on a pin 21 in the casing. The forward end of the fork 19 has a plurality of spaced fingers 22 and 23 which engage and bear against a cutter designated generally by the numeral 24. The cutter bears against and cooperates with the face of a comb designated generally by the numeral 25 attached to the forward end of the casing 12 in the conventional manner. Pressure is applied to the cutter 24 through a pin 26 which bears against the fork and urges the cutter against the comb in a manner well known in this type of shearing machine. Rotation of the shaft 14 thus causes rotation of the crank 15 bringing about oscillation of the fork 19 and consequently of the cutter 24 so that the cutter moves from side to side of the comb, making a complete reciprocation, that is, a movement across and back with each rotation of the shaft 14. As a result of this movement, the cutter comes to a dead stop at each stroke constituting one-half a reciprocation, with the outside prong of the cutter on the outside tooth of the comb.

The present invention rests primarily in the form of the comb and cutter, one form of which has been shown in the drawing by way of illustration. In this instance the comb has eleven teeth which I have numbered 1 to 11, inclusive, whereas the cutter is provided with four prongs designated by the letters A, B, C and D. The spacing of the teeth of the comb and the prongs of the cutter is best shown in Fig. 2, which figure shows one-half of the comb, the other half representing a similar segment, as will be apparent from Figure 1. In accordance with the teaching of my aforesaid application, the teeth of the comb are unequally spaced. However, in the present application the spacing of the teeth is so coordinated with the cutter as to provide improved results. In this case the space between teeth 1 and 2 is narrow, the space between the teeth 2 and 3 is wide, that between 3 and 4 is narrow, that between teeth 4 and 5 is wide, the space between teeth 5 and 6 and the space between teeth 6 and 7 is narrow, the space between teeth 7 and 8 is wide, the space between teeth 8 and 9 is narrow, the space between teeth 9 and 10 is wide, and the space between teeth 10 and 11 is narrow. Thus, if the comb is divided into two segments along the center line of tooth #6, two similar segments are produced having alternately wide and narrow teeth, the end spaces of each segment both being narrow; or in other words, the segment has three narrow spaces and two wide spaces interposed between the narrow spaces. Through this arrangement there are two narrow spaces at the center of the comb.

Cooperating with this comb is the cutter 24 having four prongs, two of which operate on each segment of the comb. The space between the prongs of the cutter is likewise unequal in that the space between the prongs B and C is greater than the other spaces of the cutter an amount equal to one narrow space of the comb. In other words, the distance between the prongs A and B of the cutter is equal to the combined width of a wide and a narrow comb space, and likewise, the distance between the prongs C and D is equal to the combined width of a wide and a narrow comb space. On the other hand, the distance between the prongs B and C is equal to the combined width of a wide and two narrow comb spaces.

The throw or stroke of the fork 19 being such as to move the cutter so that the outside prongs A and D come to rest on the outside teeth 1 and 11 of the comb, it will be seen that each prong of the cutter moves across three spaces of the comb at each stroke. As a result, the cutter D moves from the full line position shown in Fig. 2 to the dotted line position and back at each reciprocation, and likewise the prong C moves from its full line position to its dotted line position and back. During the early part of this movement the cutter C moves across the space between the comb teeth 8 and 9, and during the latter part of this movement of the cutter, the prong D moves across the same space, as a result of which this space is traversed twice by a cutter prong during each stroke. Attention is directed to the fact that both of the cutter prongs are moving at a relatively slow speed in this area due to the fact that the cutter moves with a simple harmonic motion. In other words, the prong C moves across this space when it is starting its movement, whereas the prong D moves across this space when it is slowing down at the end of its movement. The same type of cutting action occurs in the space between the comb teeth 3 and 4, which area is traversed twice in each stroke of the cutter.

The foregoing is believed to be the reason why a cutter and comb made in accordance with this principle renders improved shearing action; that is, the fact that in at least a part of the slower cutting portions of the cutter and comb the area is traversed twice, thereby increasing the speed and ease of the shearing operation. This is accomplished by unequally spacing both the teeth of the comb and the prongs of the cutter so that adjacent prongs in each half of the cutter cover unequal numbers of teeth on the comb, the two sections or segments of the comb and cutter being similar so as to give balanced operation of the shearing device.

While I have thus described and illustrated a specific embodiment of the invention, I am aware that numerous alterations and changes may be made without departing from the spirit of the invention and the scope of the appended claims, in which—

I claim:

1. The combination in a shearing machine of a comb wherein the two teeth spaces at the center of the comb are narrow and the spaces therefrom outward to the edges of the comb comprise alternately wide and narrow spaces terminating in narrow spaces at the edge of the comb, and a pronged cutter reciprocable on the comb in a simple harmonic motion, the center space of the cutter being greater than the remaining spaces of the cutter.

2. The combination in a shearing machine of a comb wherein the two teeth spaces at the center of the comb are narrow and the spaces therefrom outward to the edges of the comb comprise alternately wide and narrow spaces terminating in narrow spaces at the edge of the comb, and a pronged cutter reciprocable on the comb in a simple harmonic motion, the space between the end prongs of the cutter and adjacent prongs being substantially equal to the combined width of a narrow and a wide comb space, and the space between the second and third prongs being equal to the combined width of two narrow and a wide comb space, whereby to cause some of the comb spaces to be traversed twice upon each stroke of the cutter.

3. The combination in a shearing machine of a comb having wide and narrow spaces between the teeth, the teeth between the edge and the center being arranged with alternating narrow and wide teeth, the first and last space being narrow, and a pronged cutter reciprocable on the comb in a simple harmonic motion, the center space of the cutter being equal to the combined width of two narrow and one wide comb space, and the remaining spaces of the cutter being equal to the combined width of one narrow and one wide comb space whereby a portion of the comb teeth are traversed twice in each stroke of the cutter.

HORACE C. WRIGHT.